UNITED STATES PATENT OFFICE.

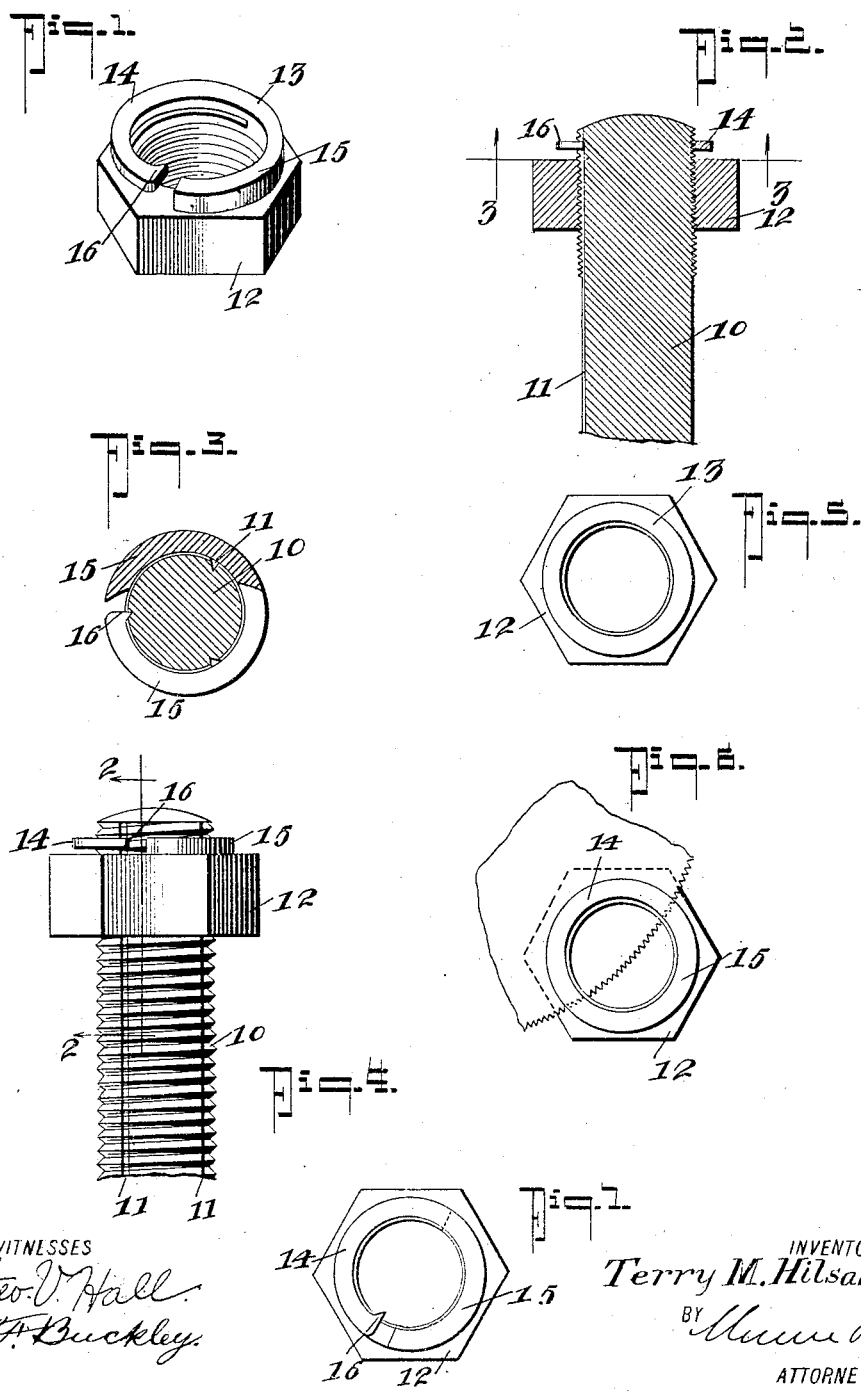

TERRY M. HILSABECK, OF LUSK, WYOMING.

NUT-LOCK.

1,364,553. Specification of Letters Patent. Patented Jan. 4, 1921.

Application filed January 30, 1920. Serial No. 355,055.

*To all whom it may concern:*

Be it known that I, TERRY M. HILSABECK, a citizen of the United States, and a resident of Lusk in the county of Niobrara and State of Wyoming, have invented certain new and useful Improvements in Nut-Locks, of which the following is a specification.

The present invention relates generally to nut locks and more particularly to that type of nut lock in which a pawl is carried by the nut and coöperates with a suitable ratchet surface provided on the bolt.

The primary object of the present invention is to provide a nut lock of this character formed of the material constituting the body of the nut and unitary and integral with the nut structure.

Another important object is to provide a nut lock of this character in which the locking elements are accessible to be easily and quickly released when desired and are remote and protected from the strains and stresses incident to the operation and use of the nut.

Another important object is to provide a nut lock of this character which may be produced with comparatively little expense and by the manufacturing facilities now provided and which is strong and durable in construction and reliable in operation.

Other objects and advantages reside in the certain novel features of the construction, arrangement and combination of parts and will become apparent as the description proceeds, reference being had to the accompanying drawings, in which, Figure 1 represents a perspective view of my improved nut lock;

Fig. 2 is a vertical section taken approximately on the line 2—2 of Fig. 4 looking in the direction of the arrows;

Fig. 3 is a horizontal sectional view taken on the line 3—3 of Fig. 2, looking in the direction of the arrows;

Fig. 4 is a fragmentary side elevational view showing the improved nut lock coöperating with the bolt structure;

Fig. 5 is an end elevational view of the nut showing the same after the first step in its manufacture;

Fig. 6 is a plan view showing the improved nut nearing the completion of the second stage of its manufacture; and Fig. 7 is a plan view of the improved nut in the final stage of its manufacture.

Referring to the drawings the type of bolt 10 with which my improved nut lock is adapted to coöperate is provided with a plurality of longitudinal slots 11 each having an inclined and a vertical wall. These longitudinal slots provide ratchet surfaces for a purpose to be hereinafter fully set forth.

The nut body 12 is first machined to provide a reduced annular shoulder 13 as shown in Fig. 5. This annular shoulder is preferably formed on the outer face of the bolt. The annular shoulder 13 is then separated for over one-half of its circumferential extent from the nut body by the action of the cutter of a milling machine or the like (shown diagrammatically in Fig. 6) which produces a cut extending transversely of the nut body and preferably at right angles to the longitudinal axis of the nut body. In this manner the annular shoulder 13 is made to consist of a separated portion 14 and a non-separated portion 15. The separated portion 14 is severed from the non-separated portion 15 at the plane of one of the junctures of these portions by cutting the annular shoulder radially. Preferably simultaneously with the radial cutting the free end of the separated portion 14 is upset inwardly to form an inwardly extending locking pawl 16 as shown in Figs. 1 and 4. The separated and non-separated portions together constitute a spring arm or resilient arm in which the resilient quality is obtained by virtue of the inherent resiliency of the metal. The locking pawl 16 is of course formed with a vertical wall and an inclined wall corresponding to the vertical and inclined walls of the grooves or ratchet surfaces of the bolt.

In practice the nut is threaded upon the bolt as shown in Fig. 4 and may be advanced to any desired degree upon the bolt due to the coaction of the inclined walls of the ratchet surfaces of the bolt and the locking pawl of the nut but normally the nut cannot be made to recede from the bolt because of the engagement of the vertical walls of the ratchet surface and the locking pawl. The resiliency of the free portion 15 of the locking arm providing for the proper engagement of the locking pawl 16 with the bolt and the ratchet surfaces thereof. When it is desired to release the nut the locking arm being freely and easily accessible may be at once released by the employment of any suitable tool or implement as is apparent. Moreover, the resilient locking arm being spaced inwardly from the working faces of the nut are remote from and protected from the strains and stresses incident to the operation and uses of the nut.

I claim:

A nut lock of the character described comprising, a nut body, an arcuate resilient locking arm formed from the nut body by providing a reduced annular shoulder on the nut body separated for over one-half of its circumferential extent from the nut body by a cut extending substantially at right angles to the longitudinal axis of the nut body, said separated portion being severed from the non-separated portion at the plane of one of its junctures therewith by a radial cut, and an inwardly extending locking pawl formed on the free end of said separated portion by inwardly upsetting the material thereof all as and for the purpose set forth.

TERRY M. HILSABECK.